US010841129B2

(12) United States Patent
Forcht et al.

(10) Patent No.: US 10,841,129 B2
(45) Date of Patent: Nov. 17, 2020

(54) SERIES MODULE, FUNCTIONAL MODULE ARRANGEMENT AND MODULAR CONTROL ARRANGEMENT

(71) Applicant: Festo SE & Co. KG, Esslingen (DE)

(72) Inventors: Ralf Forcht, Wendlingen (DE); Julian Walker, Ditzingen (DE); Dieter Schlotz, Reichenbach (DE); Vitali Lainecker, Nurtingen (DE); Matthias Ulrich, Esslingen (DE); Jochen Krinn, Esslingen (DE)

(73) Assignee: FESTO SE & Co. KG, Esslingen (DE)

(*) Notice: Subject to any disclaimer, the term of this patent is extended or adjusted under 35 U.S.C. 154(b) by 17 days.

(21) Appl. No.: 16/318,283

(22) PCT Filed: Jun. 28, 2017

(86) PCT No.: PCT/EP2017/066040
§ 371 (c)(1),
(2) Date: Jan. 16, 2019

(87) PCT Pub. No.: WO2018/019509
PCT Pub. Date: Feb. 1, 2018

(65) Prior Publication Data
US 2019/0253273 A1 Aug. 15, 2019

(30) Foreign Application Priority Data
Jul. 26, 2016 (DE) .......... 10 2016 213 724

(51) Int. Cl.
H04L 12/40 (2006.01)

(52) U.S. Cl.
CPC .. *H04L 12/40182* (2013.01); *H04L 12/40176* (2013.01); *H04L 12/40189* (2013.01)

(58) Field of Classification Search
CPC .......... H01R 13/514; G09G 3/36; H02J 4/00; H02G 15/02; G06F 13/12
See application file for complete search history.

(56) References Cited

U.S. PATENT DOCUMENTS 8,621,127 B2 * 12/2013 Ishimi .................. G06F 1/3293
710/306
9,800,047 B2 * 10/2017 Forcht ................. F15B 13/0839
2015/0169493 A1 6/2015 Gerhrke

FOREIGN PATENT DOCUMENTS

DE 10148348 A1 4/2003
DE 102011105971 A1 2/2012
DE 102013221577 A1 4/2015
(Continued)

*Primary Examiner* — Iqbal Zaidi
(74) *Attorney, Agent, or Firm* — Hoffmann & Baron, LLP

(57) ABSTRACT

A series module for a modularly configured control arrangement, with a module housing having a first series interface, a first bus interface, a second series interface and a second bus interface. A bus communication line is formed between the first bus interface and the second bus interface and at least three supply lines are formed between the first series interface and the second series interface, wherein a connecting contact is assigned to two of the supply lines in each case in order to form a consumer interface, which is configured to connect an electric consumer, and wherein at least one connecting contact coupled to the consumer interface is assigned to the third supply line and/or the bus communication line in each case.

7 Claims, 2 Drawing Sheets

(56) References Cited

FOREIGN PATENT DOCUMENTS

Figure 1:
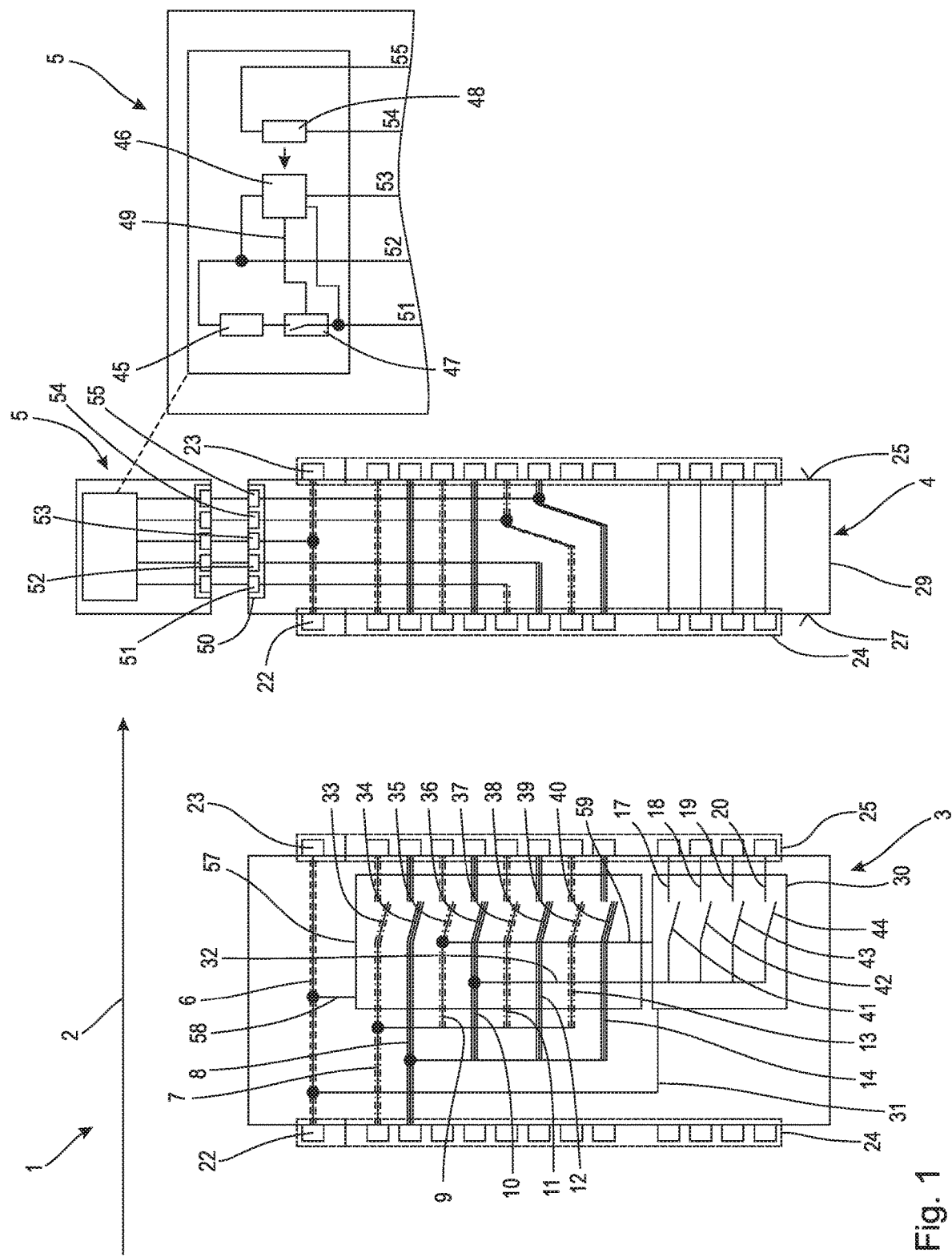

| EP | 0692753 A2 * | 1/1996 | ......... G05B 19/0423 |
|----|----|----|----|
| WO | 2009/100726 A1 | 8/2009 | |
| WO | WO 2009/100726 A1 | 8/2009 | |
| WO | 2017/017653 A1 | 2/2017 | |
| WO | WO 2017/017653 A1 | 2/2017 | |

* cited by examiner

SERIES MODULE, FUNCTIONAL MODULE ARRANGEMENT AND MODULAR CONTROL ARRANGEMENT

The invention relates to a series module for a modularly configured control arrangement, with a module housing on which a first series interface and a first bus interface as well as a second series interface and a second bus interface are formed, wherein a bus communication line is formed between the two bus interfaces and at least three supply lines are formed between the two series interfaces and wherein a connecting contact is assigned to two of the supply lines in each case in order to form a consumer interface, which is configured to connect an electric consumer. The invention further relates to a functional module arrangement and a modularly configured control arrangement.

The object of the invention is to provide a series module, a functional module arrangement and a modularly configured control arrangement in the case of which safety-related operation is enabled with simple means.

This object is achieved for a series module of the type mentioned at the outset with the features of claim 1. In this case, at least one connecting contact coupled to the consumer interface is assigned to the third supply line and/or the bus communication line in each case.

This measure means that, in addition to a supply voltage, which is provided by two of the supply lines, a control voltage or a control signal can also be provided to the consumer interface in order to be able to influence, in a safety-related manner, an electric consumer, which is connected to the consumer interface. To this end, an electric potential of the third supply line and/or a bus communication signal of the bus communication line is provided to the consumer interface such that a correspondingly configured consumer, in the case of which an AND link of the supply voltage is performed with a control voltage, which is transmitted via the third supply line, and/or with a control signal, which is transmitted via the bus communication line. The electric consumer can hereby be operated and/or switched off in a safety-related manner. For example, one of the three supply lines is at a ground potential when using the series module in a modularly configured control arrangement and electric potentials independent of one another are applied to the two other supply lines, wherein one of these potentials is used with respect to the ground potential as the supply voltage and the other potential serving with respect to the ground potential as the signal voltage in order to record a status of the modularly configured control arrangement and to be able to draw conclusions therefrom concerning a switching behaviour for the assigned electric consumer. For example, a plurality of series modules can be operated in series in a modularly configured control arrangement, wherein at least two different supply voltages are provided to different groups of series modules via the at least three connection lines and an electric consumer of one of the series modules for example cannot be switched off when the other group of series modules is switched off by corresponding voltage application of the associated supply line or supply lines.

For example, the series module, which, in the event of the other group of series modules switching off, may not lead to the consumer itself switching off, can be used for a lifting device for a workpiece, wherein this lifting device has to maintain its operational status especially in the case of the other group of series modules switching off in order to prevent any risk to the operator.

Advantageous further developments of the invention are the subject matter of the dependent claims.

It is expedient for at least one supply line to be arranged between the two series interfaces in a Z-chained manner. This measure means that a number of series modules can be organised into different electric groups without a number of differently configured series modules being required for this purpose. In fact, the Z chaining of the at least one supply line ensures interchangeability of the series modules with one another, wherein the suitable arrangement of the series modules also allow the differently actuatable groups to be formed.

The supply lines are preferably each arranged as supply line pairs, which each comprise a first supply line and a second supply line and at least two of the supply line pairs are coupled to the consumer interface. This measure means that when the series module is aligned in a row on a correspondingly configured connection module, a two-channel switch-off of the consumer arranged on the consumer interface in each case can be achieved, since for example both supply lines of a supply line pair in the connection module can be switched off in parallel in the event of a safety-related actuation of the connection module and the series modules arranged thereon in order to ensure safe shutdown of an electric consumer arranged on the respective series module.

The object of the invention is achieved for a functional module arrangement with a series module according to any one of claims 1 to 3 and with an electric consumer, which comprises a connecting interface with at least three connecting contacts, which is configured to couple with the consumer interface of the series module, wherein the consumer comprises a load circuit, which is connected to a first pairing of connecting contacts of the consumer interface and wherein the consumer comprises a control circuit, which is connected to a second pairing of connecting contacts of the consumer interface and is configured to influence at least one electric connection between the first pairing of connecting contacts of the consumer interface and the load circuit as a function of signal levels at the second pairing of connecting contacts. Accordingly, the functional module arrangement is formed by combining a series module with an electric consumer, wherein the consumer is coupled with a connecting interface to the consumer interface of the series module. The consumer, on the one hand, comprises a load circuit, for example an electromagnetic drive to actuate a fluid valve, wherein this load circuit is connected to a first pairing of connecting contacts, for example to the connecting contacts of a ground line and a first supply line. The consumer further comprises a control circuit, which is connected to a second pairing of connecting contacts, for example the ground line and a second supply line of the consumer interface, wherein the control circuit is provided to carry out an electric connection between the first pairing of connecting contacts of the connecting interface and the load circuit. The influence of the control circuit on the first pairing of connecting contacts depends on at least one signal level of the second pairing of connecting contacts, for example the control circuit can be configured such that it only allows a change of the switching state of the load circuit when a predefinable signal level is applied to the second pairing of supply lines.

In the case of an advantageous further development of the invention, the control circuit is configured as a lockout circuit, which is configured to lock a status of the load circuit as a function of signal levels at the second pairing of supply lines.

In a further configuration of the invention, the control circuit comprises a bus communication unit, which is coupled to the bus communication line, and, which is configured to convert bus communication signals into load control signals to actuate the load circuit, and the control circuit is configured to enable the load control signals as a function of signal levels at the second pairing of connecting contacts. In this case, the load circuit is actuated via a bus communication signal, which is provided via the bus communication line, and, which is converted by the bus communication unit into a corresponding load control signal. In this case, the control circuit only enables a change to a switching status of the load circuit by a corresponding signal level at the bus communication unit, provided a corresponding signal level is present at the second pairing of supply lines. For example, it is assumed that the first pairing of supply lines only serves to electrically supply the bus communication unit and the load circuit, while a signal level of the second pairing of supply lines is evaluated for the bus communication unit and the associated load circuit in the manner of a status signal, which provides information concerning a mode of operation of series modules arranged downstream, which are assigned to another group of series modules and are supplied with electric energy via the second pairing of supply lines. This status signal is evaluated in the control circuit and passed on to the bus communication unit in a suitable manner so that it provides or maintains or switches off a corresponding load control signal at the load circuit as a function of the status signal. The type of response to the status signal is dependent on the consumer assigned to the load circuit and can be fixedly predefined or freely settable in the bus communication unit.

It is advantageous for the control circuit to comprise a voltage measuring apparatus, in particular a voltage measuring apparatus coupled to the bus communication unit by means of an optocoupler. The object of the voltage measuring apparatus is to provide a status signal as a function of a voltage supply of a series module arranged downstream in order to ensure locking of a switching status of the load coupled to the control circuit. An optocoupler is preferably formed between the voltage measuring apparatus and the bus communication unit. This ensures a galvanic separation between the bus communication unit and the assigned first pairing of supply lines and the bus communication line and the second pairing of supply lines in order to ensure reliable electric decoupling between these components. For example, a transmission means for emitting electromagnetic waves, in particular in the visible light range, is assigned to the second pairing of supply lines, while the bus communication unit is assigned to a receiving apparatus for these electromagnetic waves such that the behaviour of the bus communication unit can be influenced as a function of a signal behaviour at the second pairing of supply lines.

The object of the invention is achieved for a modularly configured control arrangement for actuating a plurality of electric consumers with the features of claim 8. In this case, the modularly configured control arrangement comprises a connection module, which comprises a bus communication interface for connecting to a superordinate controller and a supply interface for connecting to an electric source as well as a combination interface with a bus interface and a series interface, wherein a bus communication line is formed between the bus communication interface and the bus interface and wherein at least two supply lines are formed between the supply interface and the series interface, wherein the connection module is connected to at least one functional module arrangement according to any one of claims 4 to 8, the load circuit of which is formed as an electric consumer from the group: switching valve, proportional valve, vacuum switching valve, electromechanical actuator. In this case, the object of the connection module is to send bus communication signals of a superordinate controller, in particular of a strategically programmable system (SPS) to a number of functional module arrangements, which can be activated in particular via a proprietary bus communication system. The object of the connection module is also to ensure an electric supply of the functional module arrangements connected in series thereto. In this case, at least in the case of a safety-related configuration of the connection module, the connection module provides a plurality of supply line pairs to the functional module arrangements, wherein the supply line pairs are capable of being switched off in the connection module separately from one another in order to thereby form groups of functional module arrangements, the mode of operation of which can be influenced by correspondingly providing or switching off supply energy via the assigned supply line pairs. The functional module arrangements connected to the connection module comprise consumers such as switching valves, proportional valves, vacuum switching valves or electromechanical actuators, which can in turn be used to influence a complex system, for example a handling or production machine.

In the case of a further development of the modularly configured control arrangement, at least one switching apparatus for interrupting the electric connection between the supply interface and the series interface is assigned to at least one, in particular each supply line in the connection module. A safety-related actuation of different groups of functional module arrangements is thereby enabled as a function of a signal of an external safety controller or as a result of internal signal processing in the modularly configured control arrangement, which groups of functional module arrangements are in each case defined by functional module arrangements associated with one group being connected to the same pairs of supply lines.

Figure 2:
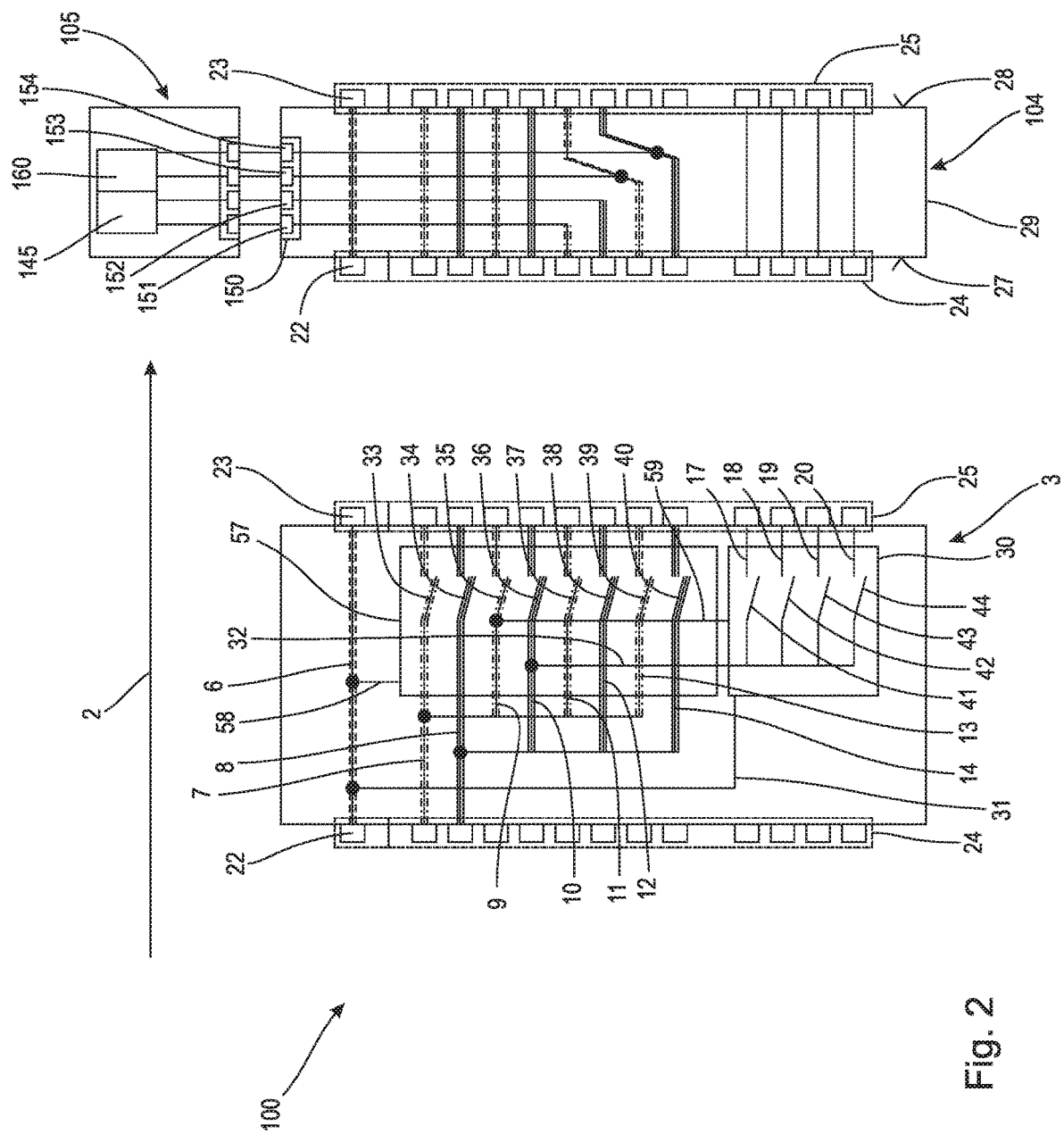

An advantageous embodiment of the invention is illustrated in the drawing, wherein:

FIG. 1 shows a schematic representation of a first embodiment of a control arrangement, which comprises a functional module arrangement and a connection module, and FIG. 2 shows a schematic representation of a second embodiment of a control arrangement, which comprises a functional module arrangement and a connection module.

A control arrangement 1 represented in FIG. 1, which may be part of an automation system not represented in further detail, which is provided for example to operate a complex technical system using a number of electrically or pneumatically-operable actuators, comprises a plurality of modules aligned along an alignment axis 2. The modules are a connection module 3 and, purely by way of example, a functional module arrangement, which comprises a series module 4 and an electric consumer 5 assigned to the series module 4. For example, the electric consumer 5 is formed as a vacuum switching valve, wherein a representation of fluid lines, which are connected to the vacuum switching valve, are omitted for clarity.

Purely by way of example, the connection module 3 and the series module 4 comprise electric lines, which are described in greater detail below. However, the connection module and the series module(s), in the case of a variant not represented in greater detail, can also comprise fluidic lines, in particular a supply line and an exhaust line.

The electric lines provided in the connection module 3 and in the series module 4 can be organised into three different groups. The first line group is formed by the bus communication line 6, which extends through the connection module 3 and through the series module 4 parallel to the alignment axis 2 and the connection module 3 and the series module 4 and possibly further series modules not represented connect to one another, purely by way of example, in an uninterrupted manner.

In the case of an embodiment of a series module not represented in greater detail, the bus communication line, which can comprise one or a plurality of lines, is guided at least in a series module to a consumer interface and is looped by the consumer, this is also designated as a daisy chain arrangement.

The connection module 3 and the series module 4 also each comprise a plurality of connection lines, which are associated either with a second group of lines, namely the supply lines, or with a third group of lines, namely the signal lines.

For example, the supply lines are each arranged in pairs, in particular they comprise a voltage-carrying line and a ground line. To illustrate the course of the supply lines, the same reference numerals for the supply lines, which are linked to one another in an electric manner, are used below in each case for the connection module 3 and for the series module 4.

As a result, on the basis of the course of the supply lines through the connection module 3 and the series module 4, supply lines 7, 8, 9, 10, 11, 12, 13, 14 are provided, purely by way of example.

In addition, with respect to the signal lines associated with the third group of lines, signal lines 17, 18, 19, 20 are provided, which begin in the connection module 3 and pass through the series module 4.

The connection module 3 comprises a first bus interface 22, a second bus interface 23, a first series interface 24 and a second series interface 25. The first bus interface 22 can also be designated as a bus communication interface since it is configured to connect to a superordinate controller not represented. The first series interface 24 can also be designated as a supply interface since it is configured to connect to an electric source not represented.

The second bus interface 23 and the second series interface 25 can also be designated as a combination interface. The bus interfaces 22, 23 and the series interfaces 24, 25 are arranged on end faces 27, 28 of a module housing 29 opposite one another in the case of the connection module 3 and the series module 4.

Purely by way of example, the connection module 3 and the series module 4 each have the same interfaces at least in an electromechanical respect. In the case of a variant of the connection module not represented in greater detail, it can also have another electromechanical interface configuration on the input side.

In the case of the connection module 3, the first bus interface 22 serves to connect to an upstream bus participant in the case of which it may optionally be a bus node or a superordinate controller, in particular a strategically programmable system (SPS). In any case, a bus communication signal is provided by the superordinate controller or the bus node to the first bus interface 22, which is transmitted along the alignment axis 2 through the series module 4 arranged downstream or further series modules not represented.

In this case, the connection module 3 and the series module 4 can individually access the bus communication signal transmitted via the bus communication line 6 and perform reading and/or writing operations in this regard in order to for example infer parameters or commands for the actual operation from the bus communication signal or to send information for further bus participants, in particular superordinate control apparatus to the bus communication signal.

The first and second bus interfaces 22, 23 of the series module 4 and any further series modules not represented are for example configured identically such that different connection means, for example different plug connectors do not have to be used.

The series interfaces 24 and 25 provided on the series module 4 are also each configured so as to be compatible with one another in an electromechanical respect, wherein the allocation of connecting contacts to the individual series interfaces of downstream series modules not represented can differ from the series interfaces 24, 25 of the series module 4.

In the case of the connection module 3, for example, the first series interface 24 has, purely by way of example, only two connecting contacts, not represented in greater detail, connecting to associated supply lines 7, 8, whereby electric energy can be fed into the connection module 3. The other sockets, not represented in greater detail, in the series interface 22 of the connection module 3 are, in contrast, not connected or allocated.

In contrast, in the case of the second series interface 23 of the connection module 3, which is facing the subsequent series module 4, all connecting contacts, not represented in greater detail, are connected to assigned supply lines 7 to 14 and signal lines 17 to 20. Therefore, the electric potentials or signals applied there can be transmitted to the series module 4 and further series modules arranged downstream along the alignment axis 2. For example, in the case of the connection module 3, the supply line 7 is connected to the supply lines 9, 11 and 13. The supply line 8 is also connected to the further supply lines 10, 12 and 14. Therefore, the electric potentials provided to the supply lines 7 and 8 in each case can be provided to the assigned supply lines 9, 10, 11, 12, 13, 14 in each case.

A first bus communication circuit 30 and a second bus communication circuit 57 are also provided in the connection module 3, which may in particular in each case be a microprocessor or microcontroller. The first and the second bus communication circuit 30, 57 are in each case connected to the bus communication line 6 via a communication line 31, 58, which, like the bus communication line 6, can also comprise one or a plurality of conductors.

The first bus communication circuit 30 is also connected via coupling lines 32, 59, purely by way of example, to the supply line 9, 10. A plurality of switches 41 to 44 are formed in the first bus communication circuit 30. The switching status of these switches 41 to 44 can in each case be individually changed according to a programme stored in the first bus communication circuit 30 as a function of a bus communication signal provided via the communication line 31. As a result, electric connections between the coupling line 32 and each of the assigned signal lines 17 to 20 can be optionally and individually established or interrupted. In this case, the signal lines 17 to 20 are provided to the second series interface 25 of the connection module 3 in the same manner as the supply lines 7 to 14.

The supply lines 7 to 14 of the connection module 3 must in each case be considered in pairs and serve to supply groups of series modules arranged downstream along the alignment axis 2 and not represented in greater detail. In this case, one supply line 7, 9, 11, 13 of a respective supply line pair in each case serves as the ground line, while the other supply line 8, 10, 12 and 14 of the supply line pair is voltage-carrying.

A plurality of switches 33 to 40 are formed in the second bus communication circuit 57, which is electrically supplied for example by the supply lines 7 and 8. The switching status of these switches 33 to 40 can in each case be individually changed according to a programme stored in the bus communication circuit 57 as a function of a bus communication signal, in particular a safety-related bus communication signal provided via the communication line 58. As a result, electric connections between the supply lines 7 to 14 and the connecting contacts of the second series interface 25 not represented in greater detail and assigned to the respective supply lines 7 to 14 can be optionally and individually influenced.

The signal lines 17 to 20 in the connection module 3 are provided for an individual supply of individual consumers not represented in greater detail.

In the case of the series module 4 assigned in FIG. 1 purely by way of example to the connection module 3, in addition to the bus communication line 11, all of the signal lines 17, 18, 19, 20 are also guided unchanged between the first bus interface 22 or first series interface 24 and the second bus interface 23 or second series interface 25 through the series module 4. The same also applies to the supply lines 7, 8, 9 and 10. Accordingly, with respect to the supply lines 11 and 12, purely by way of example, they are guided proceeding from the first series interface 24 inside the series module 4 to a consumer interface 50 and form connecting contacts 51, 52 there, which can be used to supply the electric consumer 5 configured for example as a vacuum switching valve.

The two supply lines 13 and 14 are arranged in the series module 4 as a Z-chaining, they emerge at the second series interface 25 at the connecting points, to which the supply lines 11 and 12 are connected at the first series interface 24 of the series module 4 and are therefore connected for a subsequent series module, not represented, at the point of the supply lines 11 and 12 with its first series interface.

A connecting contact 53 for a connection of the consumer 5 to the bus communication line 6 is also provided to the consumer interface 50 such that bus communication signals of the bus communication line 6 can be provided to the electric consumer 5. In this case, it is assumed that the electric consumer 5 has its own intelligence, in particular in the form of a microprocessor or microcontroller not represented. This intelligence is configured to convert incoming bus communication signals such that a control operation can be carried out for the vacuum switching valve of the electric consumer 5 not represented in greater detail.

In order to be able to ensure a safety-related mode of operation for the consumer 5, the consumer interface 50 also comprises connecting contacts 54, 55, which are connected inside the series module 4 to supply lines, for example to the supply lines 13 and 14. In this case, it is assumed that the electric supply of the respective supply line pairs is influenced with the aid of the bus communication circuit 57 and possibly one or a plurality of series module not represented are electrically supplied with the supply line pair, which comprises the supply lines 13 and 14. For example, the series modules supplied by the supply lines 13 and 14 can form a functional group inside an automation system, which is provided to actuate actuators such as for example pneumatic cylinders. In the event of an interruption to the automation system, this group of series modules can shut down by interrupting the supply lines 13, 14 by means of the bus communication circuit 57. However, if it should also be ensured that in this special case the consumer 5, in spite of any other bus communication signal, which is provided via the bus communication line 6, maintains a switching status, the consumer 5 can be configured such that it can only change its status, provided a predefinable electric potential difference is applied to the supply lines 13, 14. If this is not the case, in particular if for example there is no potential difference present owing to the supply voltage to the supply lines 13, 14 being switched off, the consumer 5 is configured such that it cannot change its status.

It emerges from the detail representation of the consumer 5 in FIG. 1 that the consumer 5 comprises, purely by way of example, a load 45, which can for example be a magnetic coil drive, a bus communication unit 46, an electronic switch 47 and a voltage measuring apparatus 48. In this case, the load 45 and the electronic switch 47 are connected in series and are arranged in a current branch, which extends between the connecting contact 51 and the connecting contact 52, wherein it is assumed that an electric potential is applied to the connecting contact 51 and a ground potential is applied to the connecting contact 52. The bus communication unit 46 is also connected to the connecting contact 52. Furthermore, the bus communication unit 46 is electrically connected to the connecting contact 51 and to the connecting contact 53, wherein a bus communication signal can be recorded at the connecting contact 53, which is provided via the bus communication line 6. The voltage measuring apparatus 48 is configured to determine a potential difference between the connecting contacts 54 and 55 and provides a measuring signal via a signal path not designated, for example as an optical signal, to the bus connection circuit 46.

Essentially, the following operating principle is provided for the consumer 5: it is firstly assumed that the switches 38, 39, 40 and 41 are closed in the connection module 3 such that electric voltages are in each case provided to the series module 4 via the connection line pairs with the supply lines 11, 12, 13, 14. It is also assumed that bus communication signals are provided via the bus communication line 6. Accordingly, a first electric voltage is provided between the connecting contacts 51 and 52, while a second electric voltage is provided between the connecting contacts 54 and 55, which, in the present case, however, is identical to the first electric voltage in terms of value. The bus communication unit 46 in each case obtains bus communication signals via the bus communication line 6 and the connecting contact 53, on the basis of which the electronic switch 47 can be opened or closed in a freely selectable manner by means of a control signal, which is provided from the bus communication circuit 40 to the electronic switch 47 via the control line 49. In this case, the bus communication unit 46 is configured such that the provision of the control signal depends on a signal of the voltage measuring apparatus 48. For example, the bus communication unit 46 only provides a control signal to open the electronic switch 47 via the control line 49 when the bus communication unit 46, on the one hand, receives a corresponding bus communication signal via the bus communication line 6 and, on the other hand, a signal is simultaneously provided by the voltage measuring apparatus 48, from which the bus communication unit 46 can deduce that an electric voltage is applied to the connection line pair formed by the supply lines 13 and 14. If, in contrast, there is no electric voltage applied to the connection line pair formed by the supply lines 13 and 14, the bus communication unit 46 is for example configured such that, in spite of a corresponding bus communication signal, it does not provide a control signal via the control line 49 to the electronic switch 47, by means of which the electronic switch 47 is switched off. This behaviour of the bus communication unit 46 follows the approach where a change to the switching status of the load 45 should only be made when an electric supply of a series module not represented and arranged downstream is simultaneously ensured via the connection line pair with the supply lines 13 and 14. If, in contrast, such an electric supply is not provided owing to a corresponding actuation of the switches 39 and 40, it is assumed that at this time a change may also not be made to the switching status for the load 45 such that the bus communication unit 46 is locked to a certain degree owing to the corresponding signal of the voltage measuring apparatus 48.

In the case of a control arrangement 100 represented in FIG. 2, a series module 104 is provided, in the case of which the previously described mode of functioning of the series module 4 and of the assigned consumer 5 is implemented without access to the bus communication signals. The associated consumer 105, on the one hand, comprises a load 145, which is coupled, purely by way of example, directly to the two connecting contacts 151 and 152 and therefore to the associated supply lines 11 and 12, wherein the functional position of the load 145 is influenced via the supply lines 11 and 12 and the associated switches 37 and 38. The load 145 is assigned to a locking means 160, which can be electrically supplied via the connecting contacts 153 and 154, which are, in turn, connected to the connection line pair from the supply lines 13 and 14. Purely by way of example, the locking means 160 always prevents a change in a switching status of the load 145 when there is no electric voltage applied between both connecting contacts 153 and 154. In this case, it must be assumed that a series module supplied via the supply lines 13 and 14 and not represented would be switched off in a safety-related manner and therefore a change to the switching status of the load should not take place.

The invention claimed is:

1. A functional module arrangement comprising a series module wherein the series module comprises a first series interface, a first bus interface, a second series interface and a second bus interface, wherein a bus communication line is configured between the first bus interface and the second bus interface and wherein at least three supply lines are configured between the first series interface and the second series interface and wherein two of the supply lines are each assigned a connecting contact in order to form a consumer interface, which is configured to connect an electric consumer, and wherein the third supply line and/or the bus communication line are each assigned to at least one connecting contact coupled to the consumer interface, and wherein the functional module further comprises an electric consumer, which comprises a connecting interface with at least three connecting contacts, which is configured to couple to the consumer interface of the series module, wherein the consumer comprises a load circuit, which is connected to a first pairing of connecting contacts of the consumer interface and wherein the consumer comprises a control circuit, which is connected to a second pairing of connecting contacts of the consumer interface and which is configured to influence at least one electric connection between the first pairing of connecting contacts of the consumer interface and load circuit as a function of signal levels at the second pairing of connecting contacts.

2. The function module arrangement according to claim 1, wherein the control circuit is configured as a lockout circuit, which is configured to lock a status of the load circuit as a function of signal levels at the second pairing of connecting contacts.

3. The functional module arrangement according to claim 1, wherein the control circuit comprises a bus communication unit, which is coupled to the bus communication line, and, which is configured to convert bus communication signals into load control signals to actuate the load circuit, and wherein the control circuit is configured to enable the load control signals as a function of signal levels at the pairing of connecting contacts.

4. The functional module arrangement according to claim 3, wherein the control circuit comprises a voltage measuring apparatus.

5. A modularly configured control arrangement to actuate a plurality of electric consumers, with a connection module, which comprises a bus communication interface to connect to a superordinate controller and a supply interface to connect to an electric source and a combination interface with a bus interface and a series interface, wherein a bus communication line is configured between the bus communication interface and the bus interface and wherein at least two supply lines are configured between the supply interface and the series interface, wherein the connection module is connected to at least one functional module arrangement, the functional module arrangement comprising a series module comprising a first series interface, a first bus interface, a second series interface and a second bus interface, wherein a bus communication line is configured between the first bus interface and the second bus interface and wherein at least three supply lines are configured between the first series interface and the second series interface and wherein two of the supply lines are each assigned a connecting contact in order to form a consumer interface, which is configured to connect an electric consumer, wherein the third supply line and/or the bus communication line are each assigned to at least one connecting contact coupled to the consumer interface, and with an electric consumer, which comprises a connecting interface with at least three connecting contacts, which is configured to couple to the consumer interface of the series module, wherein the consumer comprises a load circuit, which is connected to a first pairing of connecting contacts of the consumer interface and wherein the consumer comprises a control circuit, which is connected to a second pairing of connecting contacts of the consumer interface and which is configured to influence at least one electric connection between the first pairing of connecting contacts of the consumer interface and load circuit as a function of signal levels at the second pairing of connecting contacts, the load circuit of which is configured as an electric consumer from the group: switching valve, proportional valve, vacuum switching valve, electromechanical actuator.

6. The modularly configured control arrangement according to claim 5, wherein at least one switching apparatus for interrupting the electric connection between the supply interface and the series interface is assigned to at least one, supply line in the connection module.

7. The functional module arrangement according to claim 4, wherein the voltage measuring apparatus is coupled to the bus communication unit by an optocoupler.

* * * * *